J. D. LAMMEL.
CUTTER HEAD.
APPLICATION FILED MAY 10, 1911.
1,000,526.
Patented Aug. 15, 1911.
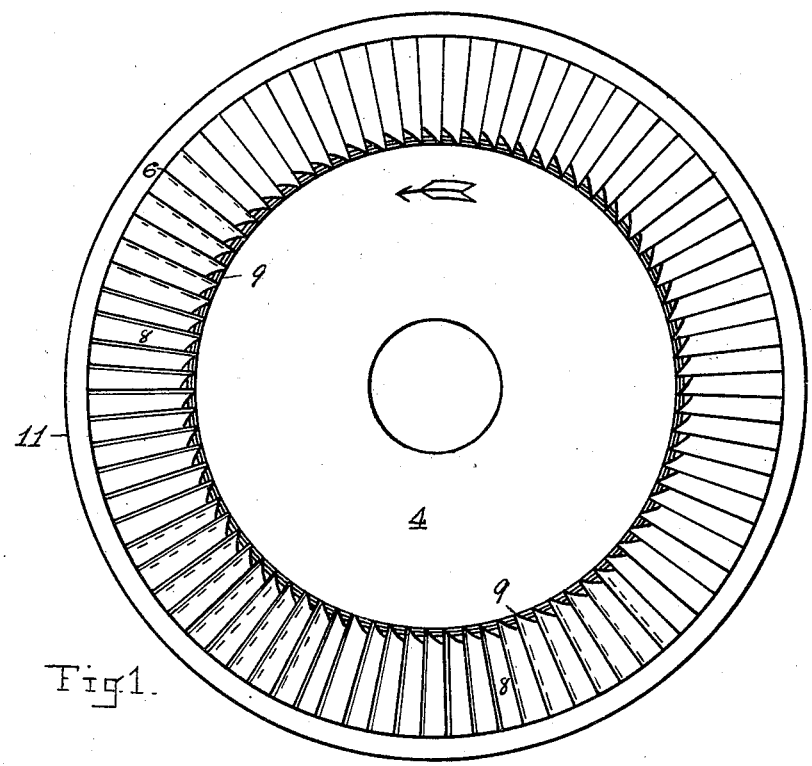
Fig. 1.
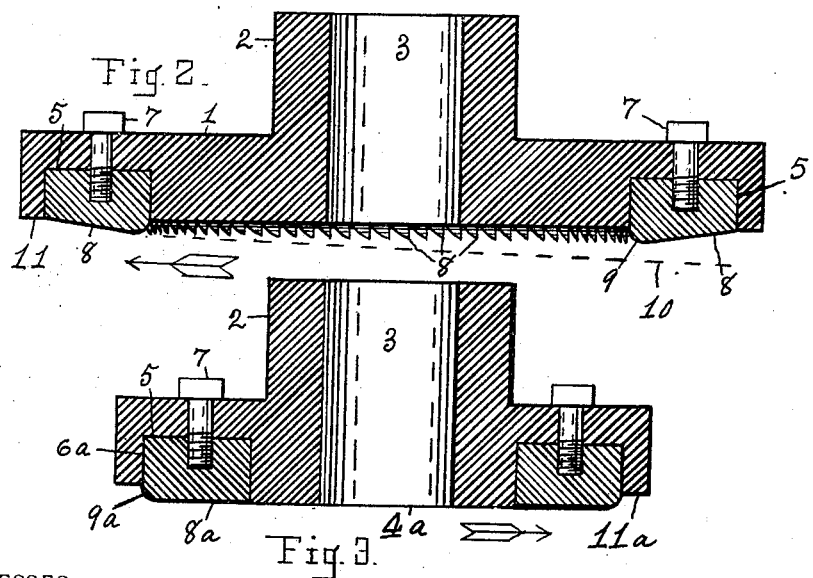
Fig. 2.
Fig. 3.
WITNESSES:
C. M. Albee.
E. E. Merchant.
INVENTOR.
John D. Lammel.
BY
G. H. Albee,
ATTORNEY.

UNITED STATES PATENT OFFICE.

JOHN D. LAMMEL, OF NEENAH, WISCONSIN.

CUTTER-HEAD.

1,000,526.

Specification of Letters Patent.  Patented Aug. 15, 1911.

Application filed May 10, 1911.  Serial No. 626,278.

*To all whom it may concern:*

Be it known that I, JOHN D. LAMMEL, a citizen of the United States, residing at Neenah, in the county of Winnebago and State of Wisconsin, have invented a new and useful Cutter-Head, of which the following is a specification.

My invention relates to a cutter head for dressing wood and is particularly applicable for jointing the edges of barrel staves, or planing any surface of wood which is cross grained, the cutting tool of the cutter head being formed of fine serrations of a saw tooth type which are designed to cut across the grain of the wood and not having the wood fed to the cutters in the direction of the length of the grain, as it is with the usual rotary cutters of planing, jointing and molding machines, the cutting portion of the tool being composed of fine teeth which will cut the surface of the wood into such fine chips that a smooth surface will be obtained, notwithstanding the wood may be one of the hard varieties and very cross grained.

My invention is shown in the accompanying drawing in which,—

Figure 1 is a plan of the face of the cutter head. Fig. 2 is a transverse section of the cutter head, and showing the lower half of Fig. 1. Fig. 3 shows a modification in the cutting tool of the cutter head.

Similar numerals and letters indicate like parts in the several views.

The cutter head consists of a flange 1, which may be of suitable cast metal, provided with a hub 2, and adapted to be secured upon one end of a shaft by means of its bore 3, and a key or other suitable fastening means, the end face of the central portion of the flange being turned off to a straight surface 4. A groove 5, is cut in the face of the flange into which a ring cutting tool 6, or 6ª, is fitted, where it is held in place with a plurality of screw bolts 7. This ring it will be observed in Fig. 2, is thicker upon its inside than at the outside circumference of the edge of its front face, the latter being about flush with the outside rim 11, of the face 4 of the ring, while the former projects from the end face. The face of this ring is composed of a series of radially arranged serrations 8, of a saw tooth type, their inner ends being rounded off at 9, and which rounded off ends form the cutting edges of the ring cutting tool.

The tool is to run in the direction of the arrow on the face of the cutter head. The wood to be jointed or dressed off, is to be fed to the cutter head by hand or by suitable feeding mechanism, in the direction of the arrow under Fig. 2, about parallel with the dotted line 10. The straight face of the teeth around the ring are not intended for doing the cutting, that being done by the rounded off ends of the teeth, but the wood being dressed is fed along about parallel with said straight face, suitable guiding bars being provided along in front of the cutting ring and to the right and left of the cutter head, against which the wood to be dressed can be guided during the cutting operation. The guide at the left of the cutter head should be set with its guiding face back from the face of the cutting teeth the distance required for cutting the required amount from the piece being dressed. As the cutters wear off, a sheet of tin, paper, or other thin sheet is to be placed between the rear side of the ring and bottom of groove for setting the teeth of the cutting ring out from the face of the cutter head flange the necessary amount for the work in hand, and thereby holding the plane of the cutting teeth parallel with the face of the flange of the cutter head.

In Fig. 3, a modification is shown in the form of the cutting ring serrations $8^a$, the outer instead of their inner ends being rounded off for forming the cutting ends $9^a$, the outer face of the serrations $8^a$, being parallel with the end face of the cutter head flange. Among the advantages of this style of the cutting teeth over those shown in Figs. 1 and 2 are, that with an outside diameter corresponding with the inside diameter of the ones shown in Figs. 1 and 2, and revolved at the same speed, the same circumferential speed of the cutting edges is obtained, and furthermore, it can be applied for dressing off surfaces that could not be reached as easily with the inside edge of the cutting ring. With this cutter head and with teeth arranged in the same direction as in Figs. 1 and 2, the direction of feed as shown by its arrow under it, is opposite from that in using the cutters of Figs. 1 and 2, and while the direction with the last named cutters is at an angle quite perceptible with the end face of the cutter head, the direction relative to the end face of the cutter head with the modified form can be so near parallel with the end face of its cutter head as to be nearly imperceptible, just enough of an angle being required to clear the teeth upon the right hand side of the ring from the edge of the piece being dressed. The piece to be operated upon for jointing or dressing it, is calculated to be fed across the center of the end face of the cutter head, although fair results may be obtained if it is fed either above or below said center.

Having described my invention, what I claim and desire to secure by Letters Patent, is,—

1. A cutter head flange adapted to be secured upon one end of a shaft for revolution therewith, its outer end face being turned off smoothly, a groove formed around and in the face of said flange, a ring fitted into said groove and projecting from the outside rim of the face of said flange, means for securing the ring within the groove, a series of serrations radially arranged across the outer face of said ring, one end of which serrations are rounded off and formed into cutting edges.

2. A cutter head flange adapted to be secured upon one end of a shaft for revolution therewith, its outer end face being turned off smoothly, a groove formed around and in the face of said flange, a ring fitted into said groove and one edge of the ring projecting outside of the face of said flange more than the other, means for securing the ring within the groove, a series of serrations radially arranged across the outer face of said ring, one end of which serrations are rounded off and formed into cutting edges.

3. A cutter head flange adapted to be secured upon one end of a shaft for revolution therewith, its outer face being turned off smoothly, a groove formed around and in the face of the flange of the cutter head, a ring fitted into said groove, the inner edge of the ring projecting outward beyond the face of the outer rim of the cutter head flange more than its outer edge, means for securing the ring within the groove, a series of serrations radially arranged across the outer face of said ring, the inner ends of which serrations are rounded off and formed into cutting edges.

JOHN D. LAMMEL.

Witnesses:
C. J. Oberweiser,
Jos. H. Long.

Copies of this patent may be obtained for five cents each, by addressing the "Commissioner of Patents, Washington, D. C."